United States Patent
Kim et al.

(10) Patent No.: US 12,121,935 B2
(45) Date of Patent: Oct. 22, 2024

(54) PELLET DEFECT INSPECTION SYSTEM USING MULTI COLOR TONE CONTROL AND METHOD FOR CONTROLLING THE SAME

(71) Applicant: LG Chem, Ltd., Seoul (KR)

(72) Inventors: Hyun Tae Kim, Osan-si (KR); Worl Yong Kim, Osan-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/034,493

(22) PCT Filed: Sep. 14, 2021

(86) PCT No.: PCT/KR2021/012510
§ 371 (c)(1),
(2) Date: Apr. 28, 2023

(87) PCT Pub. No.: WO2022/097904
PCT Pub. Date: May 12, 2022

(65) Prior Publication Data
US 2024/0017295 A1    Jan. 18, 2024

(30) Foreign Application Priority Data

Nov. 6, 2020    (KR) .......................... 10-2020-0147913

(51) Int. Cl.
*B07C 5/342*    (2006.01)
*B07C 5/36*    (2006.01)
(Continued)

(52) U.S. Cl.
CPC .............. *B07C 5/3425* (2013.01); *B07C 5/36* (2013.01); *G06T 7/0004* (2013.01); *G06T 7/20* (2013.01);
(Continued)

(58) Field of Classification Search
CPC .................................. B07C 5/3425; B07C 5/36
(Continued)

(56) References Cited

U.S. PATENT DOCUMENTS 9,101,962 B2    8/2015 Ackley et al.
2011/0297590 A1    12/2011 Ackley et al.
(Continued)

FOREIGN PATENT DOCUMENTS

CN     109772733 A  *  5/2019
JP     H08-332633 A    12/1996
(Continued)

OTHER PUBLICATIONS

Vieth; Kai-Uwe, "Method for Preparing a System Which is Used to Optically Identifying Objects, Laboratory Image Capturing System for Carrying Out Such a Method, and Arrangement Comprising the Laboratory Image Capturing System and the System" (English Translation), Aug. 1, 2013, worldwide.espacenet.com (Year: 2013).*

(Continued)

*Primary Examiner* — Michael McCullough
*Assistant Examiner* — Molly K Devine
(74) *Attorney, Agent, or Firm* — Lerner David LLP

(57) ABSTRACT

A pellet defect inspection system using a multi color tone control, which continuously transfers pellets to detect colors of the pellets, thereby determining whether the pellets are defective, and a method for controlling the same. The pellet defect inspection system includes: a pellet defect inspection device which includes a sorter to photograph a first surface (top) and a second surface (bottom) of each of the pellets while transferring the pellets to inspect the pellets so as to separate and remove pellets that are determined as defective and transfer and load non-defective pellets to designated positions; and a multi color tone pellet inspection controller configured to photograph the first surface and the second (Continued)

surface of each of the pellets transferred along a lane while controlling the pellet transfer and changing an RGBW irradiation section so as to analyze and determine an image.

12 Claims, 13 Drawing Sheets

(51) Int. Cl.
   *G06T 7/00* (2017.01)
   *G06T 7/20* (2017.01)
   *G06T 7/90* (2017.01)
(52) U.S. Cl.
   CPC ...... *G06T 7/90* (2017.01); *G06T 2207/10024* (2013.01); *G06T 2207/10152* (2013.01)
(58) Field of Classification Search
   USPC .................................................. 209/577, 580
   See application file for complete search history.

(56) References Cited

U.S. PATENT DOCUMENTS

| | | |
|---|---|---|
| 2013/0134072 A1 | 5/2013 | Ackley et al. |
| 2014/0260104 A1 | 9/2014 | Ackley et al. |
| 2015/0314334 A1 | 11/2015 | Ackley et al. |
| 2016/0107198 A1 | 4/2016 | Ackley et al. |
| 2017/0008036 A1 | 1/2017 | Ackley et al. |
| 2017/0341110 A1 | 11/2017 | Ackley et al. |
| 2018/0071788 A1* | 3/2018 | Anup ..................... G01N 21/84 |
| 2019/0126324 A1 | 5/2019 | Ackley et al. |
| 2020/0101498 A1 | 4/2020 | Ackley et al. |
| 2020/0300748 A1 | 9/2020 | Bremer |
| 2021/0114063 A1 | 4/2021 | Ackley et al. |

FOREIGN PATENT DOCUMENTS

| | | | |
|---|---|---|---|
| JP | 2001-027610 A | 1/2001 | |
| JP | 2001-060815 A | 3/2001 | |
| KR | 100240956 B1 | 1/2000 | |
| KR | 100997858 B1 | 12/2010 | |
| KR | 101051103 B1 | 7/2011 | |
| KR | 20120054834 A | 5/2012 | |
| KR | 20140094709 A | 7/2014 | |
| KR | 101891515 B1 | 8/2018 | |
| KR | 20190010589 A | 1/2019 | |
| KR | 102009757 B1 | 8/2019 | |
| KR | 2020-0044491 A | 4/2020 | |
| WO | WO-2013110529 A1 * | 8/2013 | ........... B07C 5/3425 |

OTHER PUBLICATIONS

Wang; Kedian, "Defective Bamboo Block Detection Sorting Device and Method Based on Visual Sense" (English Translation), May 21, 2019, worldwide.espacenet.com (Year: 2019).*

Basics: PMW, Naver Blog, online, Apr. 2015, Retrieved from <https://opentutorials.org/module/2106/12246> 5 pgs.

International Search Report for PCT/KR2021/012510 mailed Dec. 21, 2021. 3 pgs.

* cited by examiner

PELLET DEFECT INSPECTION SYSTEM USING MULTI COLOR TONE CONTROL AND METHOD FOR CONTROLLING THE SAME

CROSS-REFERENCE TO RELATED APPLICATIONS

The present application is a national phase entry under 35 U.S.C. § 371 of International Application No. PCT/KR2021/012510 filed on Sep. 14, 2021 which claims the benefit of priority based on Korean Patent Application No. 10-2020-0147913, filed on Nov. 6, 2020, all contents of which are incorporated herein by reference.

TECHNICAL FIELD

The present disclosure relates to pellet inspection and sorting, and more particularly, to a pellet defect inspection system using a multi color tone control, which continuously transfers a plurality of pellets to detect colors of the pellets, thereby determining whether the pellets are defective, and a method for controlling the same.

BACKGROUND ART

Pellets, which are solid particles of a synthetic resin that represents petrochemicals, are widely used in various fields such as films, pipes, and automobile interior materials. Since the pellets that are raw materials have a significant influence on quality of a final product, quality control and impurity control are very important. Particularly, in a manufacturing process, since unexpected different colors such as black, yellow, red, or other colors occur, or defective pellets having foreign substances attached or mixed with non-pellet substances, irregular shapes having sizes or shapes out of a dimensional range, black spots due to carbonization or foreign substance of raw materials or subsidiary materials, and the like occur, it is necessary to sort and remove foreign particles.

According to the related art, when producing pellets, which are raw materials for synthetic resin injection molding, a pellet sorting device capable of sorting only standardized pellets is used to manufacture synthetic resin injection molding products that require precision. The pellet sorting device according to the related art is designed so that the pellets are formed from an extruder and supplied to a hopper through a discharge line, a screen mesh is installed at a lower portion of the hopper, and low-frequency vibration is applied to sort only the standardized pellets.

However, in a sorting method using the screen mesh, since the pellets are sorted depending on a shape and size of the mesh, the sorting is deteriorated in precision. In addition, it is impossible to sort pellets containing defects such as different colors, foreign substances, abnormal shapes, and dark spots, and thus, the pellets have be measured by an additional method, and also, since a size of each pellet is small, and an amount of processing that needs to be processed per hour is 1,200 kg per hour, about 4 million or more have be inspected, and since a production speed per pellet is 40 mm/sec, which is very fast, there is a limit to solving quality problems.

In addition, an 'artificial intelligence program-based foreign material sorting device' that acquires an original image using a camera while transferring an object containing a plurality of pellets, converts the original image into a preset size, and discriminates normal and abnormal pellets using the converted image is disclosed in Korean Patent Registration No. 10-2009757.

However, the pellet sorting device including the conventional foreign matter sorting device is a color and foreign matter sorting device for a large circular object such as a bean rather than a hexahedral shape such as a pellet. For circular objects, even if the camera is positioned to view from both sides, there is an advantage because the image mapping section is minimized, but there is a minimal imaging range due to depth issues, which has limitations in detecting defects except for the inner most portion. Additionally, since it is not possible to acquire color information from both sides of pellets, there is a limit to detecting defects.

Therefore, there is a demand for development of new technologies that are capable of improving accuracy and efficiency of pellet inspection and sorting operations.

DISCLOSURE OF THE TECHNOLOGY

Technical Problem

An object of some implementations of the present invention for solving problems of the pellet inspection and sorting technology according to the related art is to provide a pellet defect inspection system using multi color tone control, which is capable of detecting colors of pellets while continuously transferring the plurality of pellets to determine whether pellets are defective, and a method for controlling the same.

An object of some implementations of the present invention for solving the above problem is to provide a pellet defect inspection system using multi color tone control, which acquires colors and images on both surfaces of the pellets while continuously transferring the pellets at a high speed to detect different colors, foreign substances, abnormal shapes, dark spots, and the like and effectively remove pellets that are determined as being defective while transferring the pellets, thereby improving accuracy and efficiency of pellet inspection and sorting operations, and a method for controlling the same.

An object of some implementations of the present invention is to provide a pellet defect inspection system using multi color tone control, which is capable of parameterizing luminance and color to enable optimized imaging of a product, thereby improving inspection of the pellets and accuracy and efficiency of the sorting operation, and a method for controlling the same.

An object of some implementations of the prevent invention is to provide a pellet defect inspection system using multi color tone control, which is capable of receiving pellets, which are determined as good products, at regular intervals to manufacture a plate-shaped sample of a molded product and inspecting whether the manufactured sample of the molded product is defective, thereby checking whether defects inside the pellets occur, and a method for controlling the same.

The objects of the present invention are not limited to the aforementioned objects, but other objects not described herein will be clearly understood by those skilled in the art from descriptions below.

Technical Solution

A pellet defect inspection system using a multi color tone control according to an aspect of the present invention that preferably achieves one or more of the above objects includes: a pellet defect inspection device including a sorter configured to photograph a first surface and a second surface of each of pellets while transferring a plurality of pellets to inspect the pellets so as to remove pellets that are determined as being defective and transfer and load pellet that are determined as good products to designated positions; and a multi color tone pellet inspection controller configured to photograph a first surface (top surface) and a second surface (bottom surface) of each of the pellets transferred along a lane while controlling the pellet transfer and changing an RGBW irradiation section so as to analyze and determine an image.

The multi color tone pellet inspection controller may include a pellet transfer controller configured to control a first pellet transfer part that transfers the pellets supplied from a pellet supply part forward from a rear side, a pellet delivery part disposed on a front end of the first pellet transfer part to transfer the pellets transferred through the first pellet delivery part downward, and a second pellet transfer part disposed below the first pellet transfer part to receive the pellets transferred downward through the pellet transfer part so as to transfer the pellets backward from a front side in a state in which the pellets are turned upside down so that the pellets to be inspected are photographed in the stable state.

The multi color tone pellet inspection controller may include a vision inspection controller configured to control a first vision inspection part disposed above a first pellet transfer part to photograph the first surface (top surface) of the pellet so as to inspect whether the pellets are defective and a second vision inspection part disposed above the second pellet transfer part to photograph the second surface of the pellet and inspect whether the pellets are defective so as to reflect a pellet reference color, photograph the pellets while changing the RGBW irradiation section, and analyze and determine images so that the pellets are sorted.

The first vision inspection part and the second vision inspection part may acquire colors, shapes, sizes, and the like of the pellets with R/G/B/W lightings by using a 12 M/8 Hz camera to inspect defects such as different colors, foreign substances, abnormal shapes, black spots, and the like the control of the vision inspection controller.

When the pellet defect inspection device is set up before new pellets are inspected, all R/G/B/W lightings may be used to identify a certain number of good products and a certain number of defective products to the pellet inspection device, and to repeat an inspection process until 100% accuracy is achieved, so as to provide optimized coloring conditions and classification criteria to be reflected in actual pellet inspection.

The vision inspection controller may include: a multi color tone control irradiation part configured to reflect a reference color so that a size and irradiation intensity of a RGBW irradiation section is adjusted based on unique color information of the pellets to be inspected and photograph the pellets to be inspected while changing the size and the irradiation intensity of the irradiation section, a reflection image capturing part configured to capture a pellet image according to the RGBW irradiation of the multi color tone control irradiation part, an image capturing object position tracking part configured to track a transfer position of the pellets to be inspected by the reflection image capturing part, and an image analysis and determination part configured to analyze the captured image of the reflection image capturing part so as to determine good products and defective products so that the pellets are sorted.

The multi color tone control irradiation part may be configured so that RED/GREEN/BLUE/WHITE light sources are provided as one control lamp, and a pulse width modulation (PWM) form is digitally encoded from 0 to 255 to irradiate the Red/Green/Blue/White into a set section.

The multi color tone control irradiation part may include: a pellet reference color reflection part configured to reflect the reference color so that the size setting and irradiation intensity of the RGBW irradiation section are adjusted based on the unique color information of the pellets to be inspected; and an RGBW irradiation section changing part configured to adaptively change a size of an R irradiation section, a size of a G irradiation section, a size of a B irradiation section, and a size of a W irradiation section based on a deviation between the unique color information of the pellets to be inspected and the defect detection result; and an accumulated defect value calculation part configured to accumulate defect values for each RGBW irradiation section to outputs a final defect value.

The sorter of the pellet defect inspection device may include: a pellet supply part configured to supply a plurality of pellets; a first pellet transfer part configured to transfer the pellets supplied from the pellet supply part forward from a rear side; a pellet delivery part disposed on a front end of the first pellet transfer part to transfer the pellets transferred through the first pellet transfer part downward; a second pellet transfer part disposed below the first pellet transfer part to receive the pellets transferred downward through the pellet delivery part and turn the pellets upside down at an angle of 180° so as to transfer the pellets backward from a front side; a first vision inspection part disposed above the first pellet transfer part to photograph a first surface of each of the pellets so as to inspect whether the pellets are defective; a first dispensing part disposed in front of the first vision inspection part to suction the pellets that are determined as being defective by the first vision inspection part so as to separate the defective pellets from the first pellet transfer part; a second vision inspection part disposed above the second pellet transfer part to photograph a second surface of each of the pellets so as to inspect whether the pellets are defective; a second dispensing part disposed behind the second vision inspection part to suction the pellets that are determined as being defective by the second vision inspection part so as to separate the defective pellets from the second pellet transfer part; and an unloading part disposed on a rear end of the second pellet transfer part to receive the pellets transferred through the second pellet transfer part so as to transfer the pellets to a designated unloading position.

A method for controlling a pellet defect inspection system using a multi color tone control according to an aspect of the present invention that preferably achieves another object includes: distributing pellets to be accommodated in a lane of a first transfer plate and transferred forward from a rear side at a predetermined speed when the pellets P are put into a sorter; photographing a first surface (top surface) of each of the pellets transferred along a lane while changing an RGBW irradiation section; analyzing and determining an image while tracking a position of the object to be image-captured so as to discharge the pellets determined as being defective; transferring the pellet of which the first surface (top surface) is inspected to a lane of a second transfer plate to turn the pellets upside down so that a second surface (bottom surface) is faced upward; photographing the second surface (bottom surface) of each of the pellets transferred along the lane while changing the RGBW irradiation section; and analyzing and determining an image while tracking a position of an object to be image-captured so as to discharge the pellets determined as being defective.

In the photographing of the pellets while changing the RGBW irradiation section, a reference color may be reflected so that size setting and irradiation intensity of the RGBW irradiation section are adjusted based on unique color information of the pellets to be inspected.

In the process of photographing the pellets while changing the RGBW irradiation section, a size of an R irradiation section, a size of a G irradiation section, a size of a B irradiation section, and a size of a W irradiation section may be adaptively changed based on a deviation between unique color information of the pellets to be inspected and a defect detection result.

Advantageous Effects

As described above, the pellet defect inspection system using the multi color tone control and the method for controlling the same according to an some aspects of the present invention may have one or more of the following effects.

First, the colors of the pellets may be detected while continuously transferring the plurality of pellets to detect whether the pellets are defective.

Second, the colors and images on both the surfaces of the pellets may be acquired while continuously transferring the pellets at the high speed to detect the different colors, the foreign substances, the abnormal shapes, the dark spots, and the like and effectively remove the pellets that are determined as being defective while transferring the pellets, thereby improving the accuracy and efficiency of the pellet inspection and the sorting operations.

Third, the luminance and the color may be parameterized to enable the optimized imaging of the product, thereby improving the inspection of the pellets and the accuracy and efficiency of the sorting operation.

Fourth, the pellets determined as the good products may be supplied at regular intervals to manufacture the plate-shaped sample of the molded product, and whether the manufactured sample of the molded product are defective may be inspected to check whether the defects inside the pellets occur.

DETAILED DESCRIPTION

Hereinafter, a preferred embodiment of a pellet defect inspection system using a multi color tone control and a method for controlling the same according to the present invention will be described in detail.

The characteristics and advantages of the pellet defect inspection system using the multi color tone control and the method for controlling the same according to embodiments of the present invention will become clear through the detailed description of each embodiment below.

Figure 1:
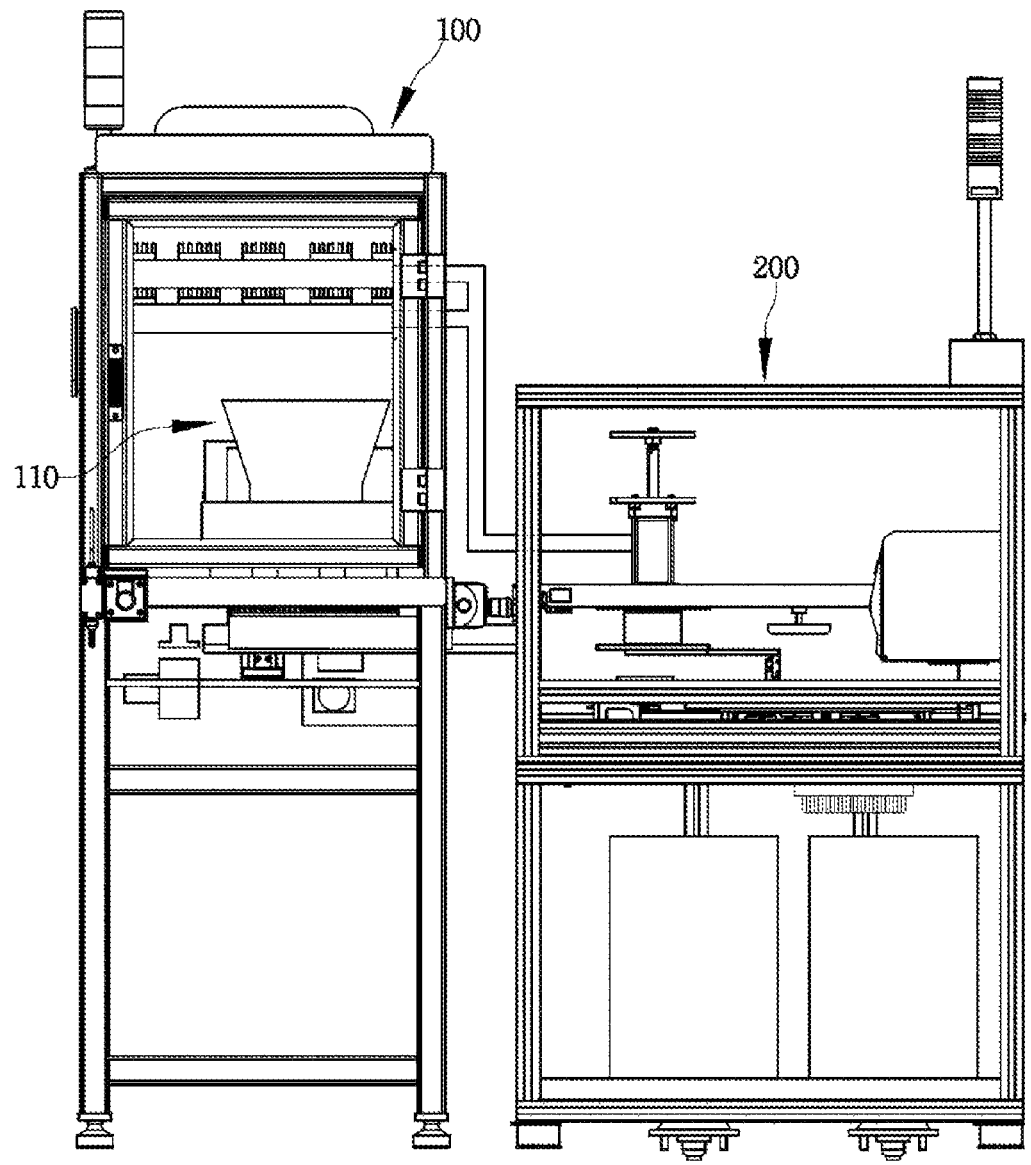
FIG. 1 is a front view illustrating a pellet defect inspection system using a multi color tone control according to an embodiment of the present invention.

FIG. 1 is a front view illustrating a pellet defect inspection system using a multi color tone control according to an embodiment of the present invention.

The pellet defect inspection system using the multi color tone control and the method for controlling the same according to an embodiment of the present invention is configured to detect colors of pellets while continuously transferring the plurality of pellets to determine whether defects occur.

For this, according to an embodiment of the present invention, colors and images of both sides of the pellets may be acquired while the pellets are continuously transferred at a high speed to detect defects such as different colors, foreign substances, abnormal shapes, and dark spots, and the like, thereby effectively removing the pellets that are determined as being defective while transferring the pellets.

Particularly, luminance and color may be parameterized to enable optimized imaging of a product, thereby improving the inspection of the pellets and accuracy and efficiency of a sorting operation.

An example of a configuration of a system to which a pellet defect inspection control technology using the multi color tone control according to an embodiment of the present invention is applied will be described below.

As illustrated in FIG. 1, the pellet defect inspection system using the multi color tone control according to an embodiment of the present invention includes a sorter 100, which photographs and inspects a first surface and a second surface of each of the pellets while transferring a plurality of pellets P to separate and remove pellets P that are determined as being defective and transfer and load pellets P having good quality to a designated position, and a sample inspector 200 which receives the plurality of pellets that are determined as good products among the pellets sorted in the sorter 100 at regular intervals to manufacture a sample S of a molded product and then photograph a first surface and a second surface of the manufactured sample S of the molded product, thereby inspecting whether the sample S of the molded product is defective.

The sorter 100 is configured to acquire sizes, shapes, colors, and the like of the plurality of pellets produced by cutting a thermoplastic resin into a certain size after extruding and molding the thermoplastic resin into the form of a thin rod and determine whether the plurality of pellets are defective so as to sort the pellets into defective products and good products and discharge the pellets that are determined as the defective products. The types of defects of the pellets inspected by the sorter 100 include different colors that are deviated from a production quality standard, foreign substances attached or mixed with non-pellet substances, abnormal shapes having sizes and shape out of a dimensional range to be produced, black spots due to carbonization or foreign substance of raw materials or subsidiary materials, and the like.

Figure 2:
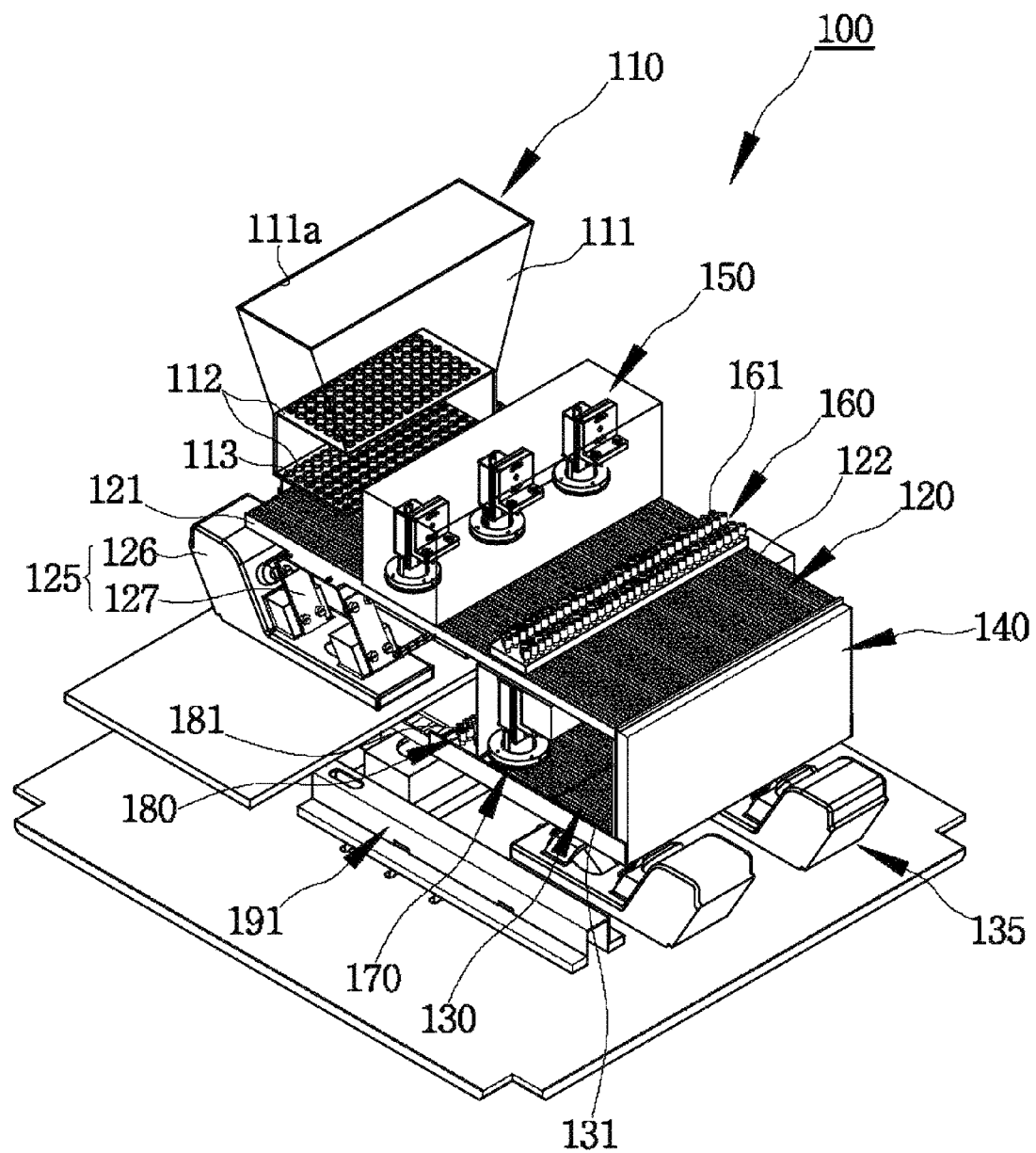
FIG. 2 is a perspective view illustrating a configuration of the pellet defect inspection system using the multi color tone control according to an embodiment of the present invention.

FIG. 2 is a perspective view illustrating a configuration of the pellet defect inspection system using the multi color tone control according to an embodiment of the present invention.

Figure 3:
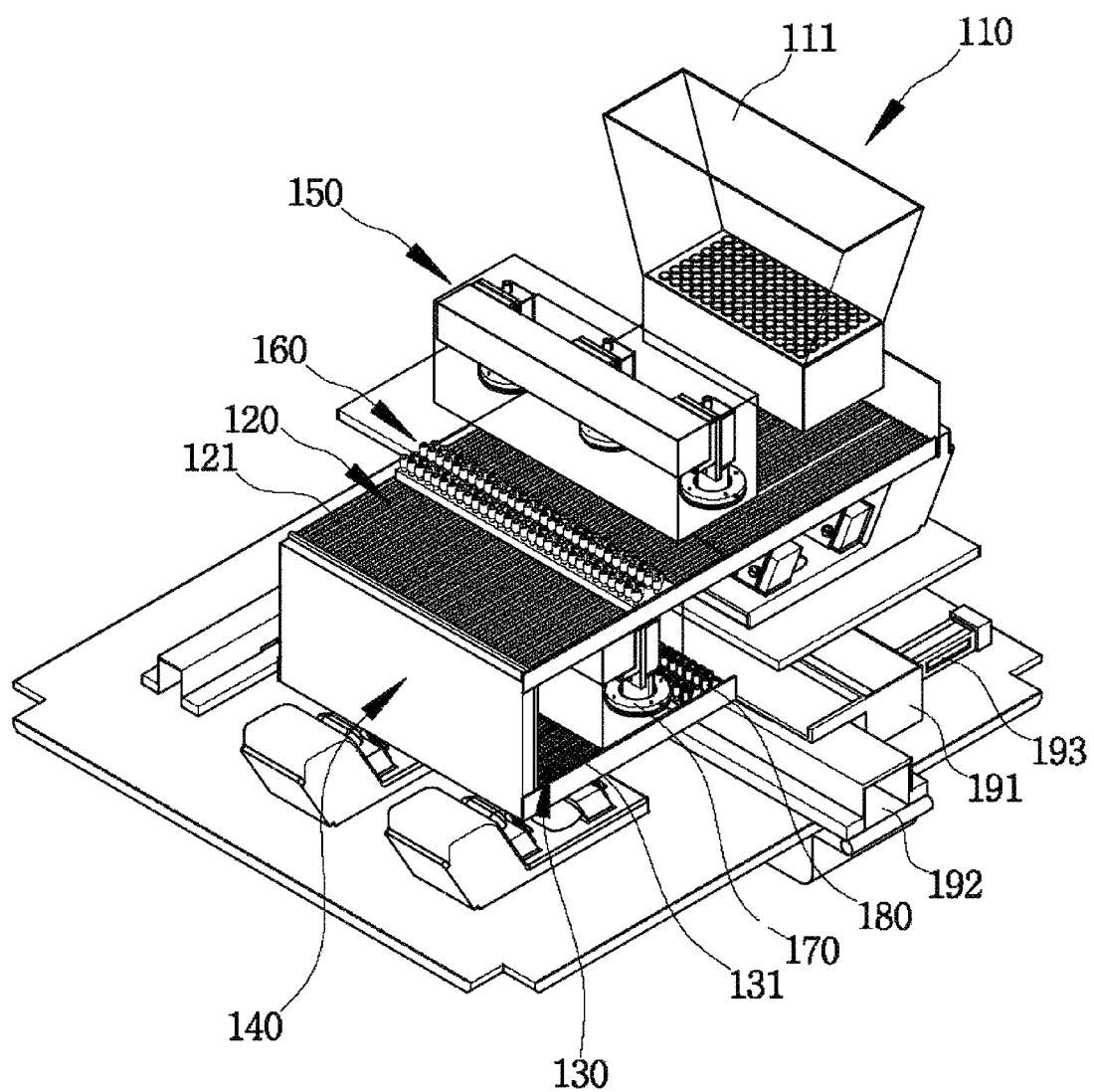
FIG. 3 is a perspective view illustrating a sorter illustrated in FIG. 2 when viewed in a different direction.
Figure 4:
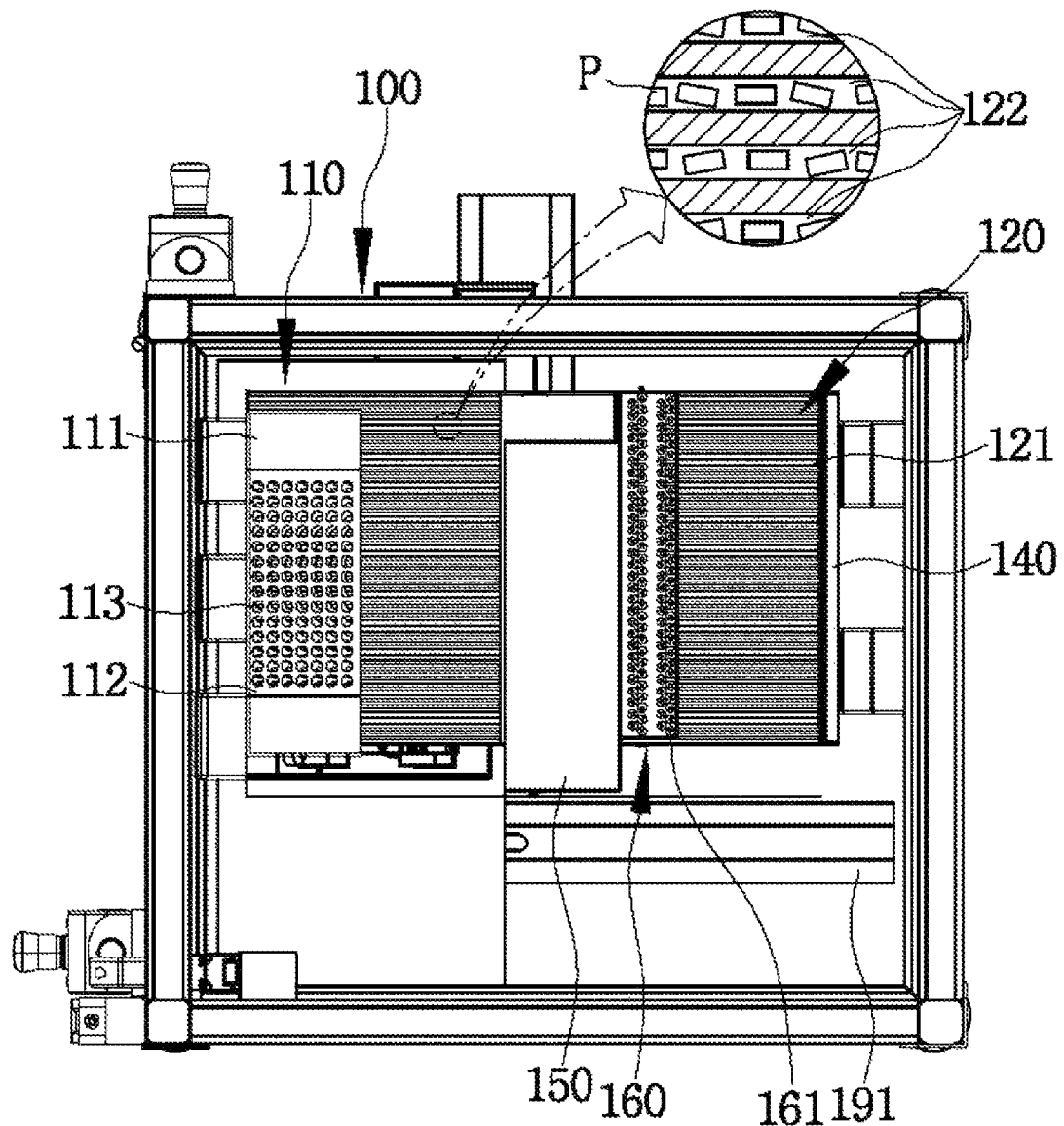
FIG. 4 is a plan view illustrating the sorter illustrated in FIG. 2.
Figure 5:
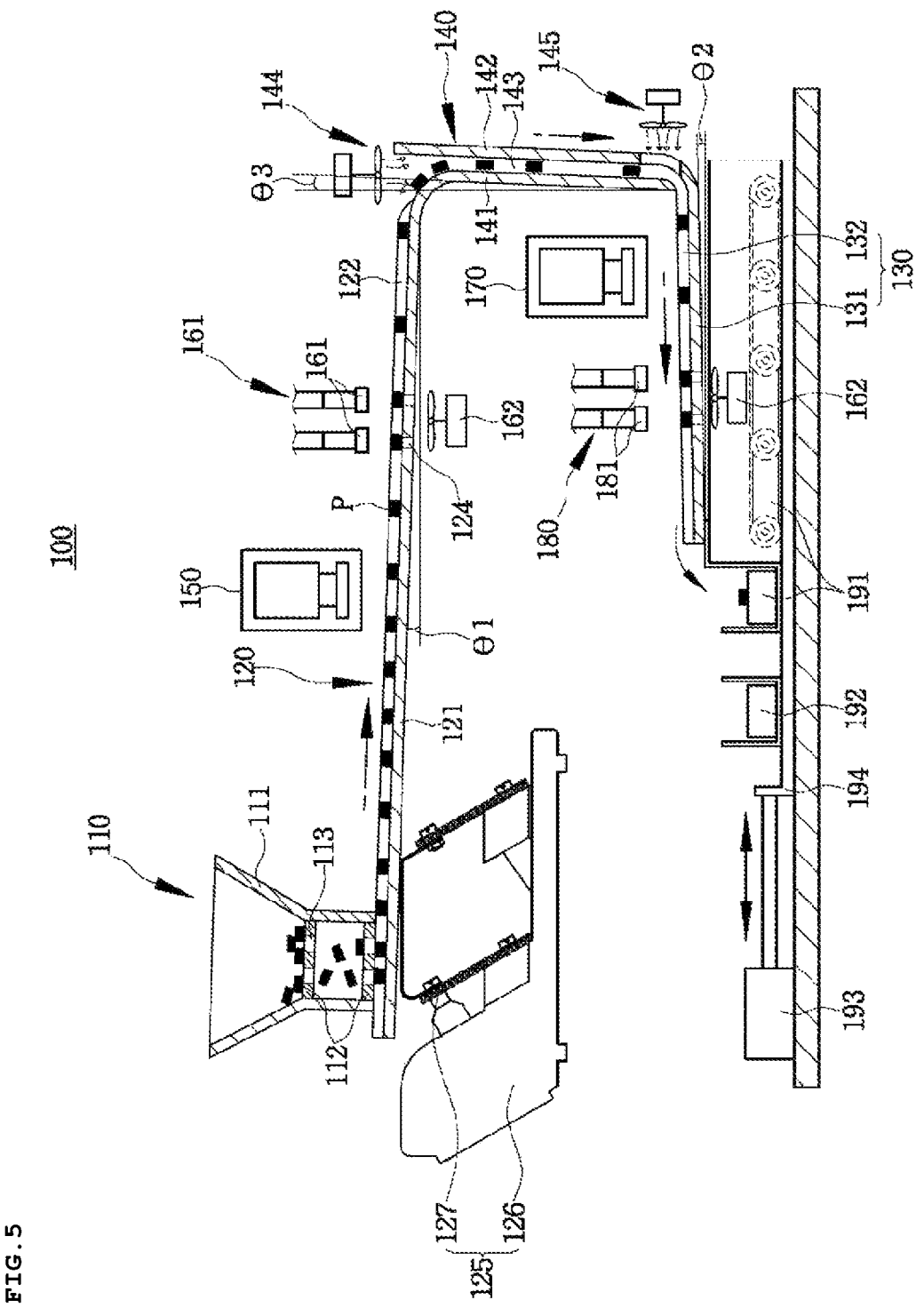
FIG. 5 is a cross-sectional view illustrating the sorter illustrated in FIG. 2.

Also, FIG. 3 is a perspective view illustrating a sorter illustrated in FIG. 2 when viewed in a different direction, FIG. 4 is a plan view illustrating the sorter illustrated in FIG. 2, and FIG. 5 is a cross-sectional view illustrating the sorter illustrated in FIG. 2.

Referring to FIGS. 2 to 5, the sorter 100 includes a pellet supply part 110 supplying a plurality of pellets, a first pellet transfer part 120 transferring the pellets P supplied from the pellet supply part 110 forward from a rear side, a pellet delivery part 140 disposed on a front end of the first pellet transfer part 120 to transfer the pellets transferred through the first pellet transfer part 120 downward, a second pellet transfer part 130 disposed below the first pellet transfer part 120 to receive the pellets P transferred downward through the pellet delivery part 140 and turn the pellets upside down at an angle of 180° so as to transfer the pellets backward from a front side, a first vision inspection part 150 disposed above the first pellet transfer part 120 to photograph a first surface (top surface) of each of the pellets P so as to inspect whether the pellets P are defective, a first dispensing part 160 disposed in front of the first vision inspection part 150 to suction and discharge the pellets inspected by the first vision inspection part 150, a second vision inspection part 170 disposed above the second pellet transfer part 130 to photograph a second surface of each of the pellets so as to inspect whether the pellets are defective, a second dispensing part 180 disposed behind the second vision inspection part 170 to suction and discharge the pellets P inspected by the second vision inspection part 170, and an unloading part disposed on a rear end of the second pellet transfer part 130 to receive the pellets P transferred through the second pellet transfer part 130 to transfer the pellets P to a designated unloading position.

The pellet supply part 110 has an upper and lower narrow hopper 111 formed so that the inlet 111a into which the pellets P are introduced is opened at the upper end, and the lower portion of the hopper 111 at intervals, and includes a plurality of distribution plates 112 formed so that a plurality of pellet distribution holes 113 which the pellets (P) passing through are vertically penetrated. Thus, when the plurality of produced pellets P are put through the input port 111a of the hopper 111, the pellets P are uniformly distributed to both sides through the pellet distribution holes 113 of the distribution plates 112 to drop onto a rear end of the first pellet transfer part 120 so as to be supplied.

The first pellet transfer part 120 includes a first transfer plate 121 installed to be inclined downward at an angle θ1 of approximately 2° to 4° forward from the rear side, and a first vibration generator 125 vibrating the first transfer plate 121 at a predetermined frequency to transfer the pellets P. A plurality of lanes 122 along which the pellets P move are formed on a top surface of the first transfer plate 121 to extend in a front and rear direction. Each of the lanes 122 has a groove extending in the front and rear direction of the first transfer plate 121, and the plurality of lanes 122 are continuously arranged in a left and right width direction of the first transfer plate 121. Each of the lanes 122 has a size slightly greater than that of each of the pellets P, and thus, the pellets P are transferred in a row through the lanes 122.

The first vibration generator 125 includes a plurality of support bars 127 having an inverted 'U' shape that supports the first transfer plate 121 at a lower portion of a rear end of the first transfer plate 121, and a vibration module 126 that vibrates the support bar 127 in a Z-axis direction, that is, in a vertical direction to vibrate the first transfer plate 121 at a frequency of 40 Hz to 440 Hz in a Z-axis direction so that the pellets P are transferred along the lanes 122 at a predetermined speed.

The second pellet transfer part 130 includes a second transfer plate 131 installed to be inclined downward at an angle θ2 of approximately 2° to 4° backward from a front side at a lower side of the first transfer plate 121 and provided with the plurality of lanes 122 in which the pellets P are accommodated, and a second vibration generator 135 that vibrates the second transfer plate 131 at a predetermined frequency.

The number of lanes 122 of the second transfer plate 131 is the same as the number of lanes 122 of the first transfer plate 121, and the second vibration generator 135 is substantially the same as the first vibration generator 125, and thus, the second transfer plate 131 is vibrated at a frequency of 40 Hz to 440 Hz in the Z-axis direction so that the pellets P are transferred backward from the front side along the lanes 122 at a predetermined speed.

Each of top surfaces of the first transfer plate 121 and the second transfer plate 131 may be coated with a light-absorbent resin such as Teflon to prevent irregular reflection in the photographing process of the first vision inspection part 150 and the second vision inspection part 170.

The first vision inspection part 150 and the second vision inspection part 170 are respectively disposed above the first transfer plate 121 and the second transfer plate 131 at a predetermined distance to photograph the pellets P transferred through the leans 122 of the first transfer plate 121 and the second transfer plate 131 so as to detect whether the pellets P are defective. The first vision inspection part 150 and the second vision inspection part 170 acquire the colors, shapes, sizes, and the like of the pellets P with R/G/B/W lightings, for example, using a 12 M/8 Hz camera to inspect defects such as different colors, foreign substances, abnormal shapes, black spots, and the like, to perform image tracking until the pellets P reach the first dispensing part 160 or the second dispensing part 180.

The first dispensing part 160 and the second dispensing part 180 are disposed in front of the first vision inspection part 150 and behind the second vision inspection part 170, respectively. The first dispensing part 160 and the second dispensing part 180 include a plurality of vacuum suction nozzles 161 and 181 arranged in left and right lateral directions above the first transfer plate 121 and the second transfer plate 131, and the vacuum suction nozzles 161 and 181 vacuum-suction the pellets P, which move along the lanes 122 of the first transfer plate 121 and the second transfer plate 131 and are determined as being defective, or the pellets P, which are determined as good products, to discharge the pellets, which are determined as being defective, into a separate defective product collection container and discharge the pellets, which are determined as the good products, into the sample detector 200.

Here, since each of the vacuum suction nozzles 161 and 181 is disposed across the plurality of lanes 122, the pellets P that are determined as being defective and the pellets P passing through the lanes 122 around the defective pellets P are vacuum-suctioned together to be discharged. The vacuum suction nozzles 161 and 181 are connected to a vacuum generator such as a known vacuum pump to generate suction power, and the pellets P suctioned through the vacuum suction nozzles 161 and 181 are discharged to the defective product collection container (not shown) or the sample inspector 200 through a flow control valve (not shown) such as a 3-way valve and then are collected.

When the first dispensing part 160 and the second dispensing part 180 suction the pellets P from the first transfer plate 121 and the second transfer plate 131, in order to prevent the pellets P from not being separated from the lanes 122, a plurality of fine ventilation holes 124, each of which has a size less than that of each of the pellets P, are formed to vertically pass through the first transfer plate 121 and the second transfer plate 131 at positions corresponding to the vacuum suction nozzles 161 and 181 of the first dispensing part 160 and the second dispensing part 180, and an auxiliary discharge blower 162 that blows air through the fine ventilation holes 124 is installed below the first transfer plate 121 and the second transfer plate 131 so that, when the process of discharging the defective pellets is performed by the vacuum suction nozzles 161 and 181, the auxiliary discharge blower 162 operates to blow air upward through the fine ventilation holes 124 to help the discharge of the pellets P.

The pellet delivery part 140 is installed substantially vertically with respect to the ground between a front end of the first transfer plate 121 and a front end of the second transfer plate 131 to transfer the pellets P transferred through the first transfer plate 121 downward, thereby performing the turning of the pellets upside down at an angle of 180° while transferring the pellets to a front end of the second transfer plate 131.

In this embodiment, the pellet delivery part 140 includes a first guide plate 141 installed to extend downward at the front end of the first transfer plate 121, a second guide plate 142 installed to be spaced apart by a certain amount greater than a thickness of the pellet P in front of the first guide plate 141, and a plurality of guide lanes 143 formed to extend vertically between the first guide plate 141 and the second guide plate 142 so as to guide the pellets S.

The guide lanes 143 are formed to correspond one-to-one to the lanes 122 of the first transfer plate 121 and the lanes 122 of the second transfer plate 131 so as to deliver the pellets S transferred through the lanes of the first transfer plate 121 to the lanes of the second transfer plate 131.

When the pellets P are transferred to the lanes 122 of the second transfer plate 131 through the guide lane 143, in order to ensure that the pellets P are transferred in the state of being turned upside down at the angle of 180°, the first guide plate 141 and the second guide plate 142 are preferably installed to be inclined at an angle θ3 of 2° to 4° with respect to an axis perpendicular to the ground.

In addition, in order that the pellets P are smoothly delivered from the front end of each of the lanes 122 of the first transfer plate 121 to the guide lane 143 and from a lower end of the guide lane 143 to the lanes 122 of the second transfer plate 131, an upper transfer auxiliary blower 144 that blows air between the upper ends of the first guide plate 141 and the second guide plate 142 may be installed at an upper side of the front end of the first guide plate 141, and a lower transfer auxiliary blower 145 that blows air backward from the front side to push and deliver the pellets transferred from the lower end of the guide lane 143 to the lane 122 of the second transfer plate 131 may be installed at the lower end of the second guide plate 142.

The unloading part is configured to receive the pellets P discharged through the rear end of the second transfer plate 141 of the second pellet transfer part 130 so as to transfer the pellets P to a designated unloading position. In this embodiment, the unloading part includes a good product transfer conveyor 191 that transfers the pellets, which are determined as being the good products, discharged through the rear end of the second transfer plate 131, an emergency discharge conveyor 192 that transfers the pellets, which are determined as being defective, discharged through the rear end of the second transfer plate 131, and a conveyor moving unit 193 that transfers the good product transfer conveyor 191 and the emergency discharge conveyor 192 to positions corresponding to the rear end of the second transfer plate 131.

The conveyor moving unit 193 includes a movable plate 194 on which the good product transfer conveyor 191 and the emergency discharge conveyor 192 are installed, and an actuator that linearly moves the movable plate 194 by a certain distance, and the movable plate 194 is linearly moved by the actuator to align the good product transfer conveyor 191 or the emergency discharge conveyor 192 with a lower side of the rear end of the second transfer plate 131 so as to receive and transfer the pellets discharged through the rear end of the second transfer plate 131.

The emergency discharge conveyor 192 is configured to process and discharge the entire amount as defective if an emergency situation in which a cumulative sum of scores designated as defective exceeds a certain value as a result of the inspection by the first vision inspection part 150 and the second vision inspection part 170 occurs.

In the process of sorting the defective pellets through the sorter 100, a certain number of good quality pellets may be periodically separated and transferred to the sample inspector 200 to manufacture a sample S of a disk-shaped molded product, and then, whether the sample S of the molded product is defective may be inspected to minimize possibility of defects in the final molded product using the pellets.

The detailed configuration of the sample inspector 200 is as follows.

Figure 6:
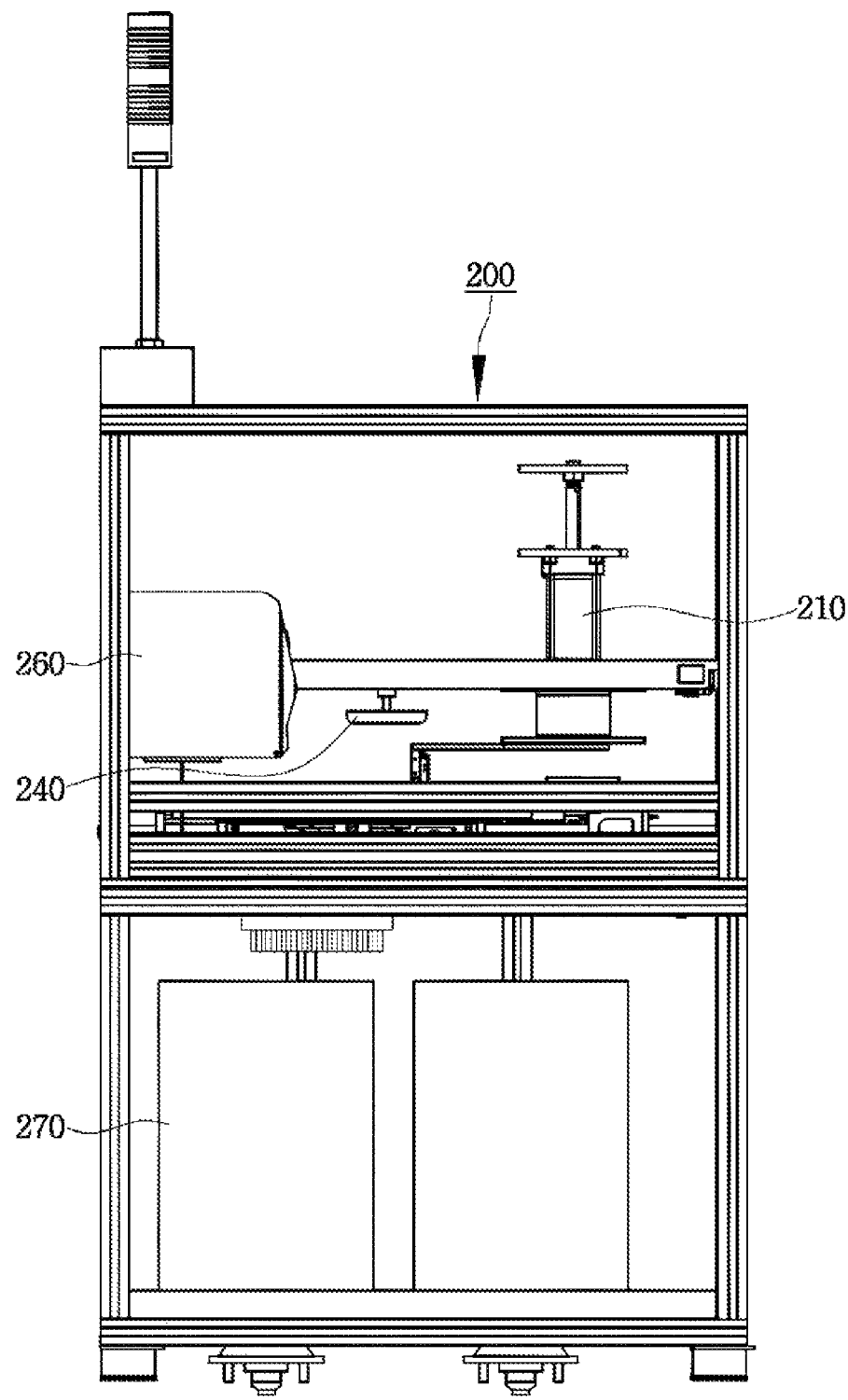
FIG. 6 is a front view illustrating a configuration of a sample inspector of the pellet defect inspection system using a deep learning-based multi color tone control according to an embodiment of the present invention.
Figure 7:
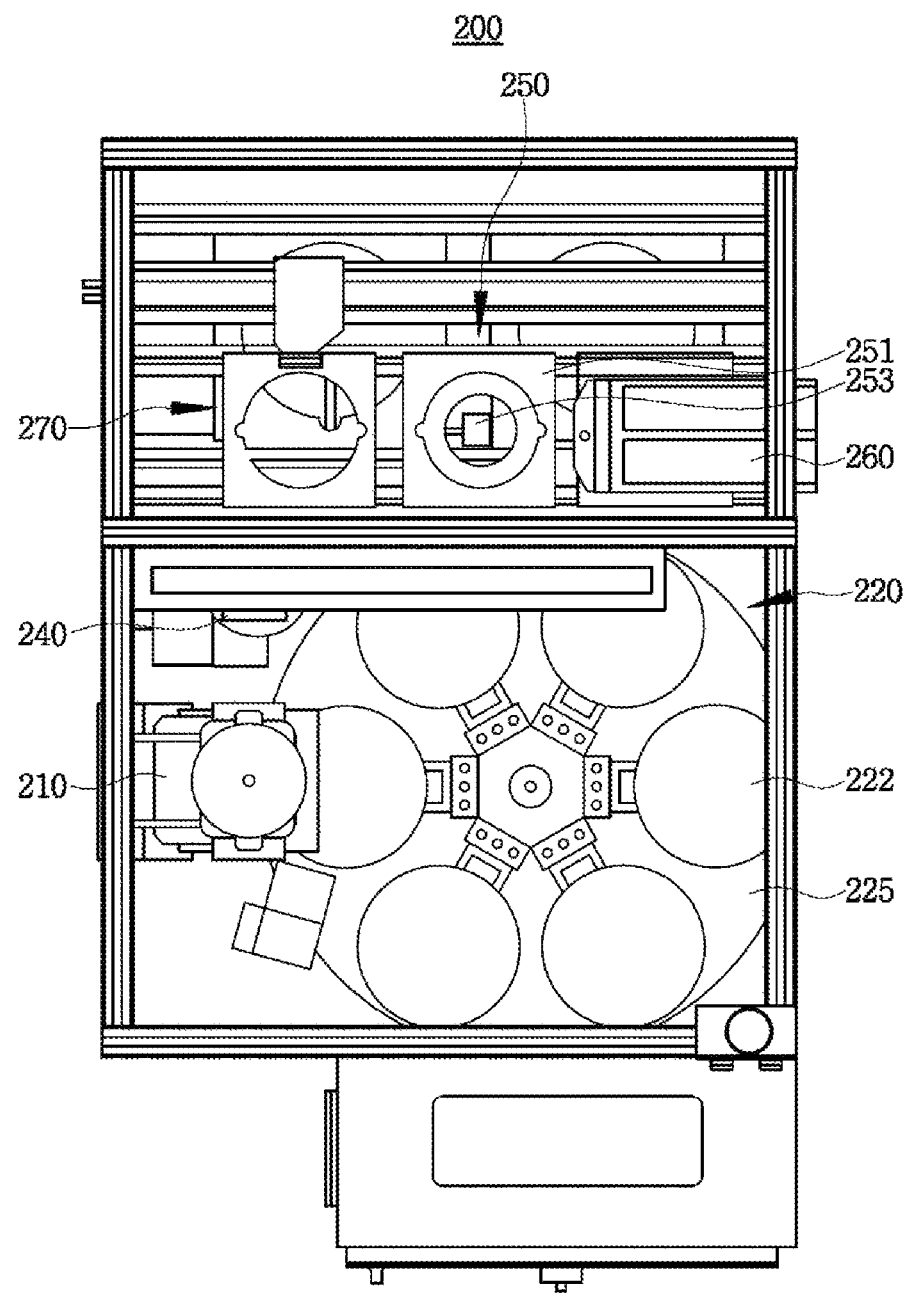
FIG. 7 is a plan view illustrating the sample detector illustrated in FIG. 6.

FIG. 6 is a front view illustrating a configuration of the sample inspector of the pellet defect inspection system using a deep learning-based multi color tone control according to an embodiment of the present invention, and FIG. 7 is a plan view illustrating the sample detector illustrated in FIG. 6.

The sample inspector 200 includes a pellet storage part 210 that receives and stores the good quality pellets from the first dispensing part 160 or the second dispensing part 180 of the sorter 100, a sample molding part 220 that manufactures the sample of the disk-shaped molded product by heating and pressing a certain amount of pellets supplied from the pellet storage part 210, a cooling part 230 that cools the sample S of the molded product manufactured in the sample molding part 220, a sample inspection part 250 that photographs top and bottoms surfaces of the sample S of the molded product transferred by a sample transfer robot 240 after being cooled by the cooling part 230 to inspect whether the sample S is defective, a marking part 260 that marks a predetermined mark on a surface of the sample inspected by the sample inspection part 250, and a sample unloading stacker 270 that loads the sample S of the molded product, which is marked in the marking part 260.

Figure 8:
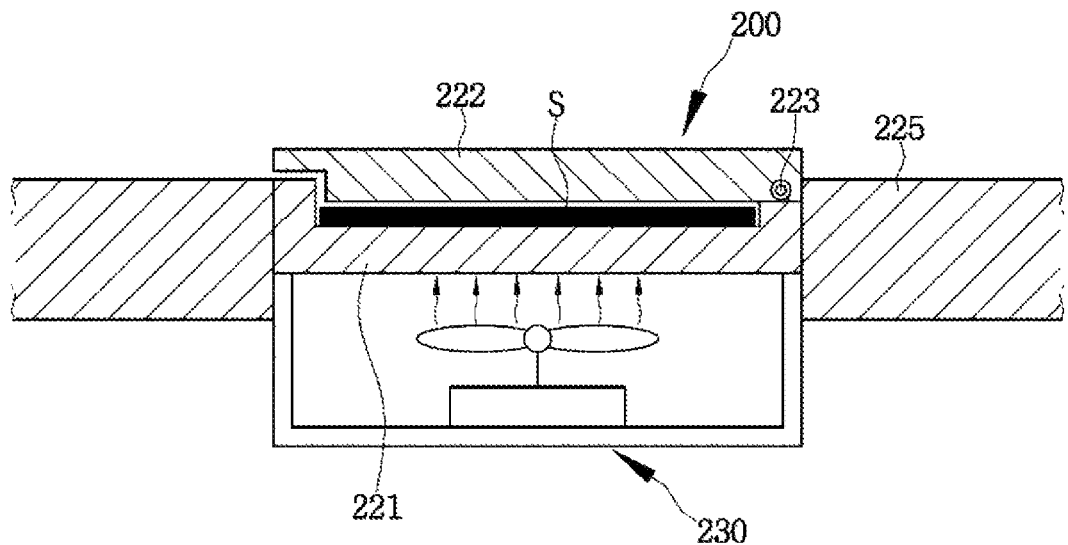
FIG. 8 is a cross-sectional view illustrating a sample molding part of the sample inspector illustrated in FIG. 6.
Figure 9:
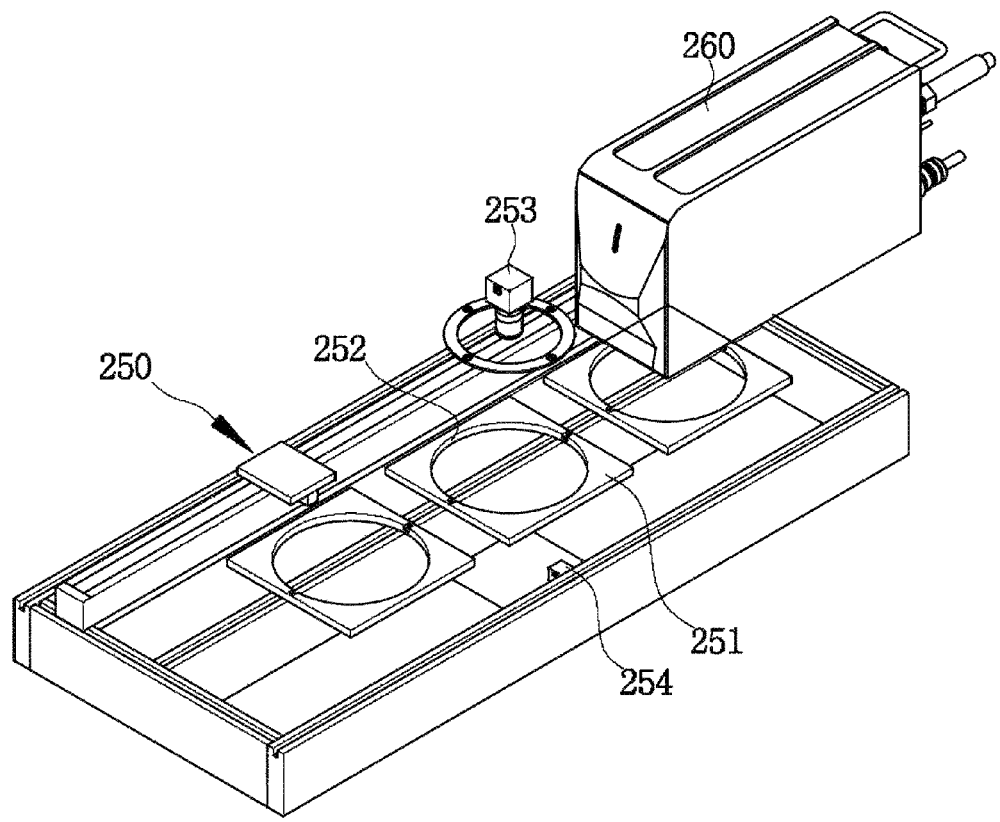
FIG. 9 is a perspective view illustrating a portion of a configuration of the sample inspector illustrated in FIG. 6.

FIG. 8 is a cross-sectional view illustrating the sample molding part of the sample inspector illustrated in FIG. 6, and FIG. 9 is a perspective view illustrating a portion of a configuration of the sample inspector illustrated in FIG. 6.

Figure 10:
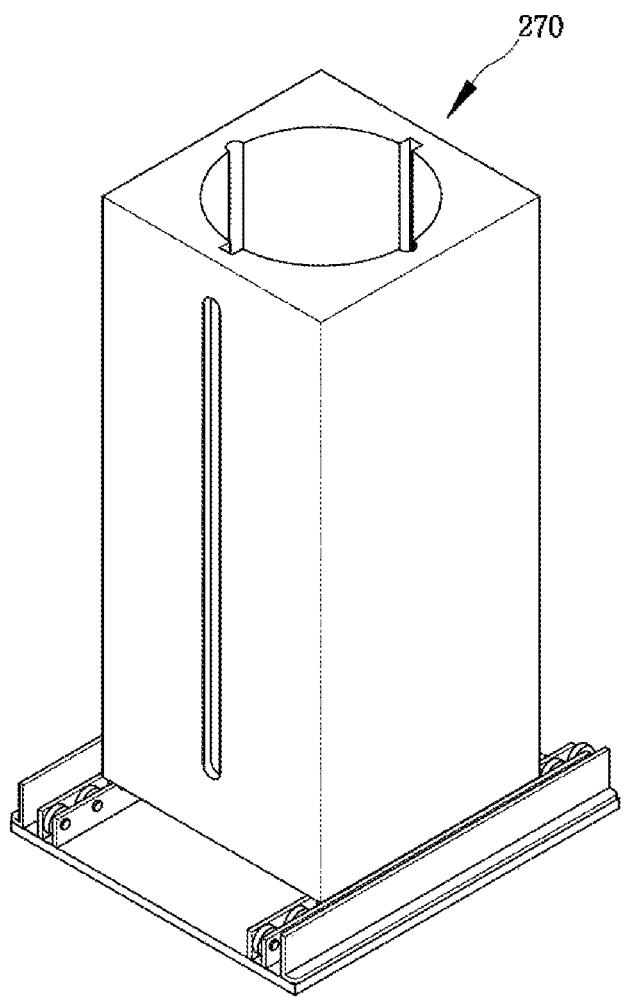
FIG. 10 is a perspective view illustrating the other portion of the configuration of the sample inspector illustrated in FIG. 6.

Also, FIG. 10 is a perspective view illustrating the other portion of the configuration of the sample inspector illustrated in FIG. 6.

The pellet storage part 210 is connected to the first dispensing part 160 or the second dispensing part 180 of the sorter 100 to receive and store the pellets, and is configured so that a sensor is installed at one side thereof to automatically supply the pellets to a lower mold 221 of the sample molding part 220 when the pellets reach a certain amount (weight).

The sample molding part 220 includes a lower mold 221 having a cavity receiving a certain amount of pellets from the pellet storage part 210, an upper mold 222 that manufactures the sample of the disk-shaped molded product by pressing the pellets put into the cavity of the lower mold 221, and a heater that melts the pellets by transferring heat to the pellets through the lower mold 221 and the upper mold 222. The heater may be individually installed in each of the lower mold 221 and the upper mold 222.

Each of the lower mold 221 and upper mold 222 of the sample molding part 220 may be provided in plurality to be arranged in a circular shape on an index table 225 that is rotatable at a predetermined angle to manufacture a plurality of samples S of the molded product at regular intervals.

The heater provided in each of the lower mold 221 and the upper mold 222 may be configured by applying a thin plate ceramic heater that is finished with PTFE. The upper mold 222 is installed to rotate vertically around a hinge shaft 223 outside one side of the index table 225 and rotates by an actuator such as a pneumatic cylinder or a hydraulic cylinder to press and mold a pellet material put into the cavity of the lower mold 221.

An index vibration unit (not shown) that vibrates the lower mold 221 is installed so that the pellets are uniformly spread throughout the cavity of the lower mold 221 when the pellets are put into the lower mold 221 from the pellet storage part 210.

In addition, in order to improve a melting rate of the pellets by preheating the pellets when the pellets are put into the lower mold 221 from the pellet storage part 210, a hot air supplier (not shown) that supplies hot air to the lower mold 221 may be additionally installed at one side of the sample molding part 220.

The cooling part 230 that cools the lower mold 221 is configured below one side of the index table 225 of the sample molding part 220. The cooling part 230 is configured to supply a cooling fluid such as air or cooling water to a bottom surface of the lower mold 221 so as to rapidly cool the sample S of the molded product on the lower mold 221.

The sample transfer robot 240 is installed at one side of the sample molding part 220 to vacuum-suction the sample S of the molded product that is molded on the lower mold 221 so as to transfer the sample S to the sample inspection part 250.

The sample inspection part 250 includes an inspection table 251 in which a circular opening 252 is formed in a center thereof, and on which an edge portion of the sample S of the molded product is seated on an edge portion of the opening 252, and upper and lower vision inspection cameras 253 and 254 disposed above and below the opening 252 of the inspection table 251 to photograph the top and bottom surfaces of the sample S of the molded product so as to inspect whether the sample S is defective.

A marking part 260 that marks designated marks such as a defective position of the inspected sample S of the molded product, an LOT number of the sample S of the molded product, and a production data and time is installed at one side of the sample inspection part 250.

The sample unloading stacker 270 may be disposed below one side of the sample molding part 220, but its position is not particularly limited. For example, the sample unloading stacker 270 is provided as a cylindrical enclosure having an opened top surface to load the plurality of samples S of the molded product. The transfer of the sample S of the molded product from the marking part 260 to the sample unloading stacker 270 may be performed by the sample transfer robot 240.

Hereinafter, the pellet defect inspection system will be described in detail with the focus on the multi color tone control according to an embodiment of the present invention.

Figure 11:
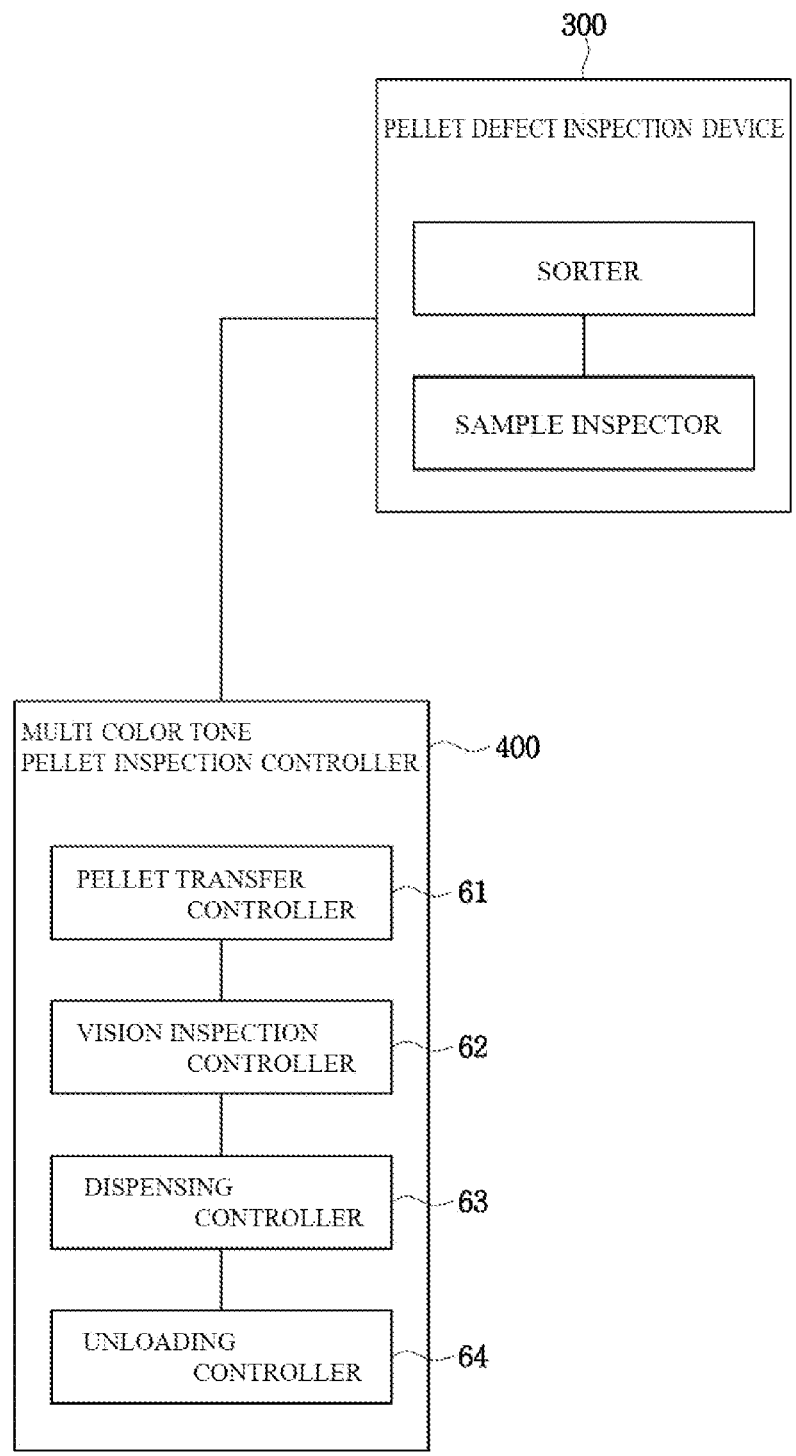
FIG. 11 is a block diagram illustrating a configuration of a control mean of the pellet defect inspection system using the multi color tone control according to an embodiment of the present invention.

FIG. 11 is a block diagram illustrating a configuration of a control mean of the pellet defect inspection system using the multi color tone control according to an embodiment of the present invention.

The pellet defect inspection system using the multi color tone control according to an embodiment of the present invention includes a pellet defect inspection device 300 including a sorter, which photographs a first surface and a second surface of each of the pellets while transferring the plurality of pellets P to inspect the pellets and then removes pellets P that are determined as being defective and transfer and load pellets P that are determined as good products to designated positions, and a sample inspector, which periodically separates a certain number of good quality pellets in the process of sorting the defective pellets through the sorter to inspect whether the sample S of the molded product is defective, thereby minimizing possibility of defects in the final molded product using the pellets, a multi color tone pellet inspection controller 400, which controls the pellet transfer, reflects a pellet reference color, and photographs the first surface (top surface) and the second surface (bottom surface) of the pellets transferred according to the lane while changing an RGBW irradiation section to analyze and determine images.

Here, the multi color tone pellet inspection controller 400 includes a pellet transfer controller 61, which controls a first pellet transfer part 120 that transfers the pellets P supplied from the pellet supply part 110 forward from a rear side, a pellet delivery part 140 disposed on a front end of the first pellet transfer part 120 to transfer the pellets transferred through the first pellet transfer part 120 downward, and a second pellet transfer part 130 disposed below the first pellet transfer part 120 to receive the pellets P transferred downward through the pellet delivery part 140 to transfer the pellets backward from a front side in a state in which the pellets P are turned upside down so that the pellets P to be inspected are photographed in the stable state, a vision inspection controller 62 which controls a first vision inspection part 150 disposed above the first pellet transfer part 120 to photograph the first surface (top surface) of the pellet P so as to inspect whether the pellets are defective and a second vision inspection part 170 disposed above the second pellet transfer part 130 to photograph the second surface of the pellet and inspect whether the pellets are defective to reflect a pellet reference color, photograph the pellets while changing the RGBW irradiation section, and analyze and determine the images so that the pellets are sorted, a dispensing controller 63 which controls a first dispensing part 160 disposed in front of the first vision inspection part 150 to suction and discharge the pellets inspected by the first vision inspection part 150 and a second dispensing part 180 disposed behind the second vision inspection part 170 to suction and discharge the pellets P inspected by the second vision inspection part 170, and an unloading controller 64 which controls an unloading part, which is disposed on a rear end of the second pellet transfer part 130 to receive the pellets P transferred through the second pellet transfer part 130 so as to transfer the pellets P to designated unloading positions.

Here, the first vision inspection part 150 and the second vision inspection part 170 acquires colors, shapes, sizes, and the like of the pellets P with R/G/B/W lightings, for example, using a 12 M/8 Hz camera to inspect defects such as different colors, foreign substances, abnormal shapes, black spots, and the like, to perform image tracking until the pellets P reach the first dispensing part 160 or the second dispensing part 180 under the control of the vision inspection controller 62.

In addition, in the vision inspection controller 62, when the pellet defect inspection device is set up before a new pellet to be inspected is inspected, all RGBW may be used to supply a certain number of good products and a certain number of defective products to the device and repeat the inspection process in which yield is 100% so as to search optimized coloring conditions and classification criteria to be reflected in actual pellet inspection.

The detailed configuration of the vision inspection controller 62 is as follows.

Figure 12:
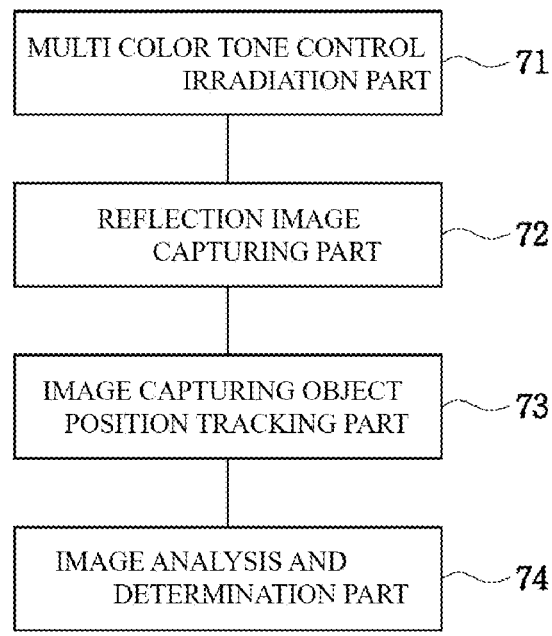
FIG. 12 is a detailed view illustrating a configuration of a vision inspection controller.

FIG. 12 is a detailed view illustrating a configuration of the vision inspection controller.

As illustrated in FIG. 12, the vision inspection controller 62 includes a multi color tone control irradiation part 71 that reflects a reference color so that a size and irradiation intensity of a RGBW irradiation section is adjusted based on unique color information of the pellets to be inspected and photographs the pellets to be inspected while changing the size and the irradiation intensity of the irradiation section, a reflection image capturing part 72 that captures a pellet image according to the RGBW irradiation of the multi color tone control irradiation part 71, an image capturing object position tracking part 73 that tracks a transfer position of the pellets to be inspected by the reflection image capturing part 72, and an image analysis and determination part 74 that analyzes the captured image of the reflection image capturing part 72 to determine good products and defective products so that the pellets are sorted.

In addition, the multi color tone control irradiation part 71 may be implemented so that an RED/GREEN/BLUE light sources are provided as one control lamp, and an PWM form is digitally encoded from 0 to 255 to irradiate the R/G/B/W into a set section, but is not limited thereto.

In addition, the multi color tone control irradiation part 71 reflects the unique color information of the pellets to be inspected to the size setting and irradiation intensity setting of the RGBW irradiation section to improve resolution of the captured image, thereby improving analysis accuracy.

In addition, the multi color tone control irradiation part 71 may accumulate defective values for each RGBW irradiation section to output a final defective value.

The detailed configuration of the multi color tone control irradiation part 71 is as follows.

Figure 13:
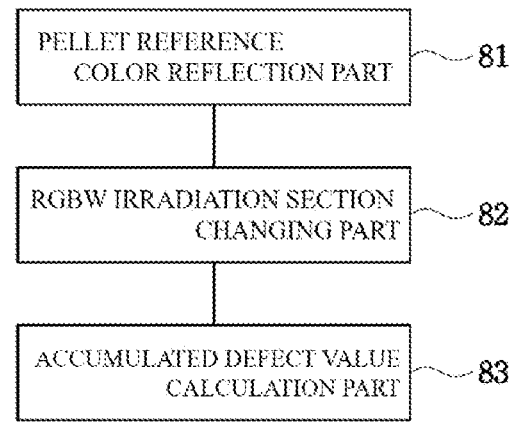
FIG. 13 is a detailed view illustrating a configuration of a multi color tone control inspection part.

FIG. 13 is a detailed view illustrating a configuration of the multi color tone control inspection part.

The multi color tone control irradiation part 71 includes a pellet reference color reflection part 81 that reflects the reference color so that the size setting and irradiation intensity of the RGBW irradiation section are adjusted based on the unique color information of the pellets to be inspected, and an RGBW irradiation section changing part 82 that adaptively changes a size of an R irradiation section, a size of a G irradiation section, a size of a B irradiation section, and a size of a W irradiation section based on a deviation between the unique color information of the pellets to be inspected and the defect detection result, and an accumulated defect value calculation part 83 that accumulates defect values for each RGBW irradiation section to outputs a final defect value.

Here, when changing the RGBW irradiation section, the size of the irradiation section causes a difference in size of the RGBW irradiation section so that an effect of the unique color of the pellets to be inspected on the pellet inspection is excluded.

In addition, if the deviation of the defect detection result is used as the reference value when changing the RGBW irradiation section, for example, if no pellet defects are detected in any one specific irradiation section of the RGBW, or if too many defective pellets are detected in any one specific irradiation section of the RGBW, an inspection optimization process of changing the size of the RGBW irradiation section may be performed.

Figure 14:
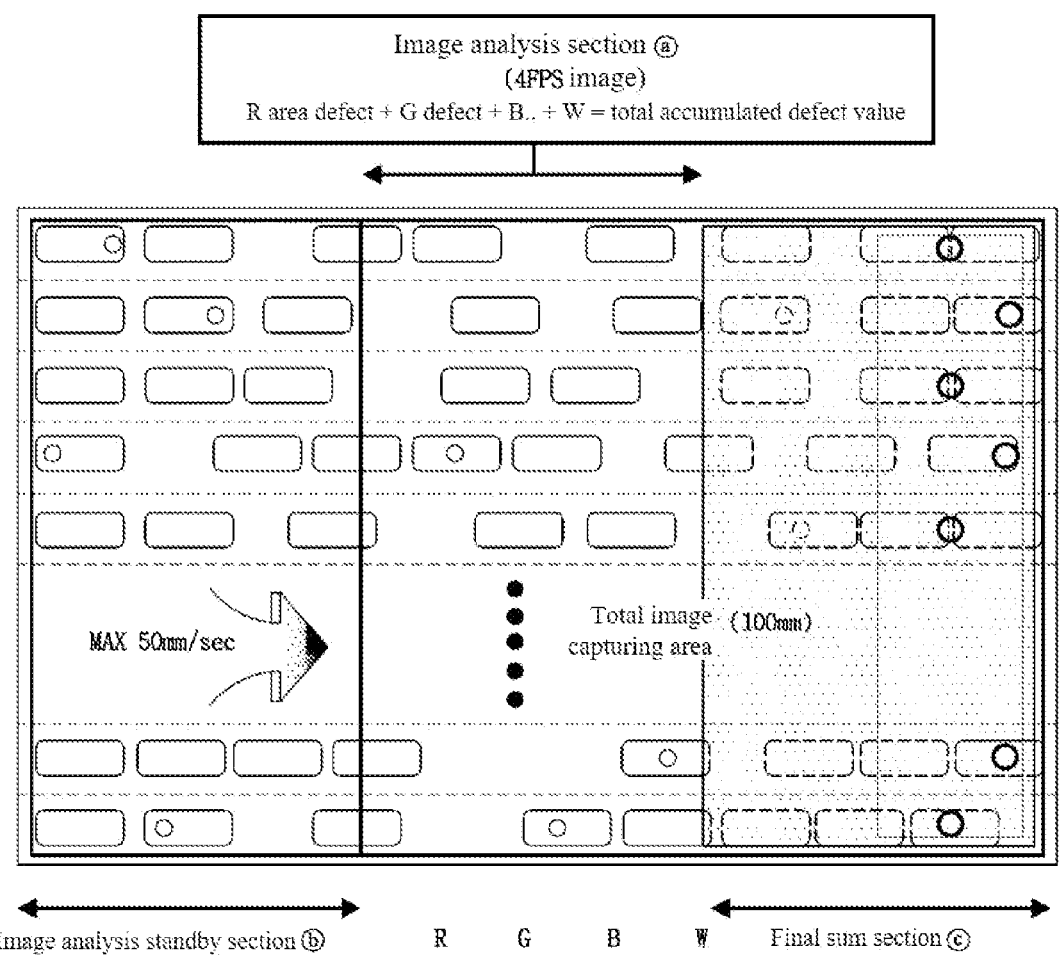
FIG. 14 is a control graph illustrating a process of inspecting pellet defects using the multi color tone according to an embodiment of the present invention.

FIG. 14 is a control graph illustrating a process of inspecting pellet defects using the multi color tone according to an embodiment of the present invention.

In the pellet defect inspection using the multi color tone control, accuracy may be improved because the pellet defects are detected by transferring light onto the surface of the pellet more directly than S/W color processing to analyze the reflected image.

Figure 15:
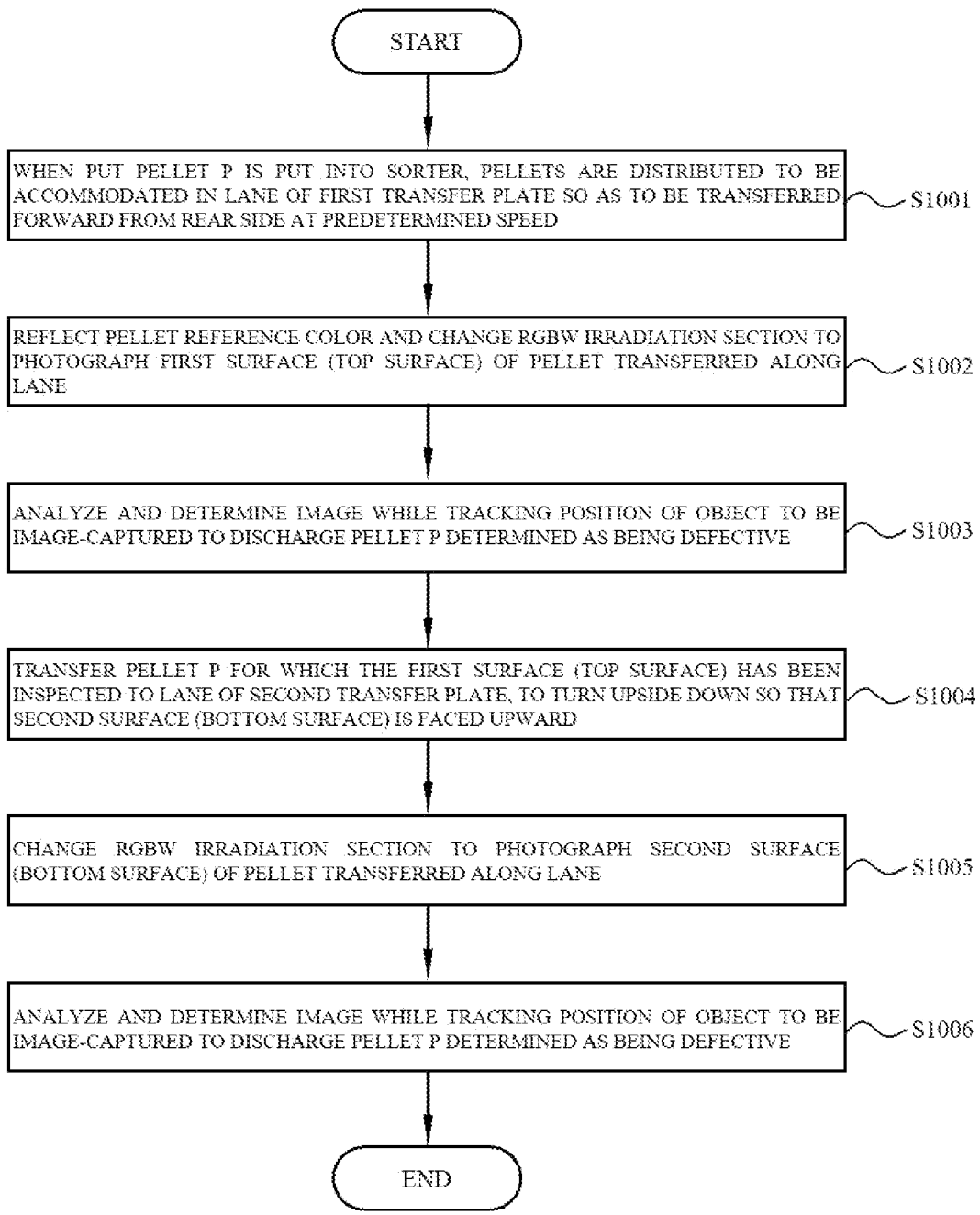
FIG. 15 is a flowchart illustrating a method for controlling a pellet defect inspection system using a multi color tone control according to an embodiment of the present invention.

FIG. 15 is a flowchart illustrating a method for controlling a pellet defect inspection system using a multi color tone control according to an embodiment of the present invention.

First, when pellets P are put into a sorter, the pellets are distributed to be accommodated in a lane of a first transfer plate and are transferred forward from a rear side at a predetermined speed (S1001), and a first surface (top surface) of each of the pellets transferred along the lane is photographed while reflecting a pellet reference color and changing an RGBW irradiation section. (S1002)

Subsequently, the image analysis and determination are performed while tracking the position of the object to be image-captured so as to discharge pellets P that are determined as being defective. (S1003)

Then, the pellets P for which the first surface (top surface) has been inspected are transferred to a lane of a second transfer plate, turned upside down so that a second surface (bottom surface) is faced upward (S1004), and then, the second surface (bottom surface) of the pellets transferred along the lane while changing the RGBW irradiation section is photographed. (S1005)

Subsequently, the image analysis and determination are performed while tracking the position of the object to be image-captured so as to discharge pellets P that are determined as being defective. (S1006)

In the method for controlling the pellet defect inspection system using the multi color tone control according to an embodiment of the present invention, in the process of photographing the pellets while changing the RGBW irradiation section, the reference color may be reflected so that the size setting and irradiation intensity of the RGBW irradiation section are adjusted based on the unique color information of the pellets to be inspected.

In addition, in the process of photographing the pellets while changing the RGBW irradiation section, a size of an R irradiation section, a size of a G irradiation section, a size of a B irradiation section, and a size of a W irradiation section may be adaptively changed based on the deviation between the unique color information of the pellets to be inspected and the defect detection result.

In the pellet defect inspection system and the method for controlling the same according to an embodiment of the present invention, the colors and images on both the surfaces of the pellets may be acquired while continuously transferring the pellets at the high speed to detect the different colors, the foreign substances, the abnormal shapes, the dark spots, and the like and effectively remove pellets that are determined as being defective while transferring the pellets, thereby improving the accuracy and efficiency of the pellet inspection and sorting operations.

As described above, it will be understood that the present technology is implemented in a modified form without departing from the essential characteristics of the present disclosure.

Therefore, it should be interpreted that the specified embodiments have to be considered from a descriptive point of view rather than a limiting point of view, and the scope of the present invention is shown in the claims rather than the foregoing description, and all differences within the equivalent range are considered to be included in the present invention.

INDUSTRIAL APPLICABILITY

The present disclosure relates to pellet inspection and sorting, and more particularly, to a pellet defect inspection system using a multi color tone control, which continuously transfers a plurality of pellets to detect colors of the pellets, thereby determining whether the pellets are defective, and a method for controlling the same.

The invention claimed is:

1. A pellet defect inspection system using a multi color tone control, comprising:
  a pellet defect inspection device including a sorter configured to photograph a first surface and a second surface of each of a plurality of pellets while transferring the plurality of pellets, so as to inspect the plurality of pellets and remove defectives ones of the plurality of pellets, wherein the sorter is further configured to transfer and load the plurality of pellets to designated positions; and
  a multi color tone pellet inspection controller configured to photograph the first surface and the second surface of each of the plurality of pellets transferred in a lane along a conveyance path, wherein the multi color tone pellet inspection controller is further configured to simultaneously control the pellet transfer and adaptively change a Red/Green/Blue/White irradiation section so as to analyze and determine an image,
  wherein, prior to inspection of the plurality of pellets, an inspection process is performed, wherein the pellet defect inspection device is configured to utilize all Red/Green/Blue/White lightings to identify a certain number of good pellets and a certain number of defective pellets to the pellet inspection device, wherein the inspection process is repeated until 100% accuracy is achieved, so as to provide optimized coloring conditions and classification criteria to be used in actual pellet inspection, and
  wherein, the multi color tone pellet inspection controller is configured to photograph the plurality of pellets while changing the Red/Green/Blue/White irradiation section, so as to adaptively change a size of a Red irradiation section, a size of a Green irradiation section, a size of a Blue irradiation section, and a size of a White irradiation section based on a deviation between a unique color information of the plurality of pellets to be inspected and a defect detection result.

2. The pellet defect inspection system of claim 1, wherein the multi color tone pellet inspection controller comprises:
  a pellet transfer controller configured to control a first pellet transfer part, the first pellet transfer part being configured to transfer the plurality of pellets supplied from a pellet supply part along the conveyance path,
  a pellet delivery part disposed on a front end of the first pellet transfer part, the pellet delivery part being configured to transfer the plurality of pellets received from the first pellet transfer part downward, and
  a second pellet transfer part disposed below the first pellet transfer part, wherein the second pellet transfer part is configured to receive the plurality of pellets transferred downward through the first pellet transfer part, wherein the second pellet transfer part is configured to invert the plurality of pellets by 180°, so as to transfer the plurality of pellets in a direction away from the pellet delivery part along the conveyance path.

3. The pellet defect inspection system of claim 1, wherein the multi color tone pellet inspection controller comprises:
  a vision inspection controller configured to control a first vision inspection camera disposed above a first pellet transfer part, the first vision inspection camera being configured to photograph the first surface of each of the plurality of pellets, so as to inspect whether the first surface of each of the plurality of pellets is defective, and
  a second vision inspection camera disposed above a second pellet transfer part, the second vision inspection camera being configured to photograph the second surface of each of the plurality of pellets, so as to inspect whether each of the plurality of pellets is defective, so as to apply a pellet reference color, photograph each of the plurality of pellets while adaptively changing the Red/Green/Blue/White irradiation section, so as to analyze and determine images so that the plurality of pellets are sorted.

4. The pellet defect inspection system of claim 3, wherein the first vision inspection camera and the second vision inspection camera are configured to acquire at least one property of the plurality of pellets, the at least one property being selected from the group consisting of color, shape, and size of the plurality of pellets with Red/Green/Blue/White lightings by using a 12 M/8 Hz camera, so as to inspect for defects by a control of the vision inspection controller.

5. The pellet defect inspection system of claim 3, wherein the vision inspection controller comprises:
  a multi color tone control irradiation part configured to reflect a reference color so that the size and an irradiation intensity of the Red/Green/Blue/White irradiation sections is adjusted based on the unique color information of each of the plurality of pellets to be inspected, wherein the multi color tone control irradiation part is configured to photograph each of the plurality of pellets to be inspected while adaptively changing the size and the irradiation intensity of the Red/Green/Blue/White irradiation sections, a reflection image capturing part configured to capture a pellet image according to a Red/Green/Blue/White irradiation of the multi color tone control irradiation part, an image capturing object position tracking part configured to track a transfer position of each of the plurality of pellets to be inspected by the reflection image capturing part, and an image analysis and determination part configured to analyze the pellet image of the reflection image capturing part, so as to determine the defectives ones of the plurality of pellets.

6. The pellet defect inspection system of claim 5, wherein the multi color tone control irradiation part is configured to provide Red/Green/Blue/White light sources from one control lamp, and a Pulse Width Modulation form is configured to be digitally encoded from 0 to 255, so as to irradiate Red/Green/Blue/White lights into a set section.

7. The pellet defect inspection system of claim 5, wherein the multi color tone control irradiation part comprises:

a pellet reference color reflection part configured to reflect the reference color so that the size and the irradiation intensity of the Red/Green/Blue/White irradiation section are adaptively adjusted based on the unique color information of each of the plurality of pellets to be inspected; and a Red/Green/Blue/White irradiation section changing part configured to adaptively change the size of the Red irradiation section, the size of the Green irradiation section, the size of the Blue irradiation section, and the size of the White irradiation section based on a deviation between the unique color information of each of the plurality of pellets to be inspected and the defect detection result; and an accumulated defect value calculation part configured to accumulate defect values for each Red/Green/Blue/White irradiation section, so as to output a final defect value.

8. The pellet defect inspection system of claim 1, wherein the sorter of the pellet defect inspection device comprises:

a pellet supply part configured to supply the plurality of pellets;

a first pellet transfer part configured to transfer the plurality of pellets supplied from the pellet supply part along the conveyance path;

a pellet delivery part disposed on a front end of the first pellet transfer part, the pellet delivery part being configured to transfer the plurality of pellets received from the first pellet transfer part downward;

a second pellet transfer part disposed below the first pellet transfer part, wherein the second pellet transfer part is configured to receive the plurality of pellets transferred downward through the pellet delivery part, wherein the second pellet transfer part is configured to invert the plurality of pellets by 180° so as to transfer the plurality of pellets away from the pellet delivery part along the conveyance path;

a first vision inspection camera disposed above the first pellet transfer part, the first vision inspection camera being configured to photograph the first surface of each of the plurality of pellets, so as to inspect whether the first surface of each of the plurality of pellets is defective;

a first dispensing part disposed between the first vision inspection camera and the pellet delivery part, wherein the first dispensing part is configured to suction the defective ones of the plurality of pellets, wherein the first vision inspection camera is configured to determine a defect of each of the plurality of pellets, so as to separate the defective ones of the plurality of pellets from the first pellet transfer part;

a second vision inspection camera disposed above the second pellet transfer part, the second vision inspection camera being configured to photograph the second surface of each of the plurality of pellets, so as to inspect whether the second surface of each of the plurality of pellets is defective;

a second dispensing part disposed after the second vision inspection camera along the conveyance path, wherein the second dispensing part is configured to suction the defective ones of the plurality of pellets, wherein the second vision inspection camera is configured to determine a defect of the second surface of each of the plurality of pellets, so as to separate the defective ones of the plurality of pellets from the second pellet transfer part; and an unloading part disposed after the second pellet transfer part along the conveyance path, wherein the unloading part is configured to receive the plurality of pellets from the second pellet transfer part, so as to transfer the plurality pellets to a designated unloading position.

9. The pellet defect inspection system of claim 1, wherein the multi color tone pellet inspection controller is configured to accumulate defect values for each of the Red/Green/Blue/White irradiation sections, so as to output a final defect value based on the accumulated defect values for each of the Red irradiation section, Green irradiation section, Blue irradiation section, and White irradiation section.

10. A method for controlling a pellet defect inspection system using a multi color tone control, the method comprising:

distributing a plurality of pellets in a lane of a first transfer plate and transferring the plurality of pellets along a conveyance path at a predetermined speed;

photographing a first surface of each of the plurality of pellets transferred along the lane of the first transfer plate while adaptively changing a Red/Green/Blue/White irradiation section;

analyzing and determining an image of the first surface while tracking a position of an object to be image-captured, so as to discharge defective ones of the plurality of pellets;

transferring each of the plurality of pellets of which the first surface is inspected to a lane of a second transfer plate, so as to invert each of the plurality pellets 180°, so that a second surface is faced upward;

photographing the second surface of each of the plurality of pellets transferred along the lane of the second transfer plate while adaptively changing the Red/Green/Blue/White irradiation section; and analyzing and determining an image of the second surface while tracking a position of an object to be image-captured, so as to discharge the defective ones of the plurality of pellets, wherein, prior to inspection of the plurality of pellets, an inspection process is performed, wherein the pellet defect inspection device uses all Red/Green/Blue/White lightings to identify a certain number of good products and a certain number of the defective pellets to the pellet inspection device, wherein the inspection process is repeated until 100% accuracy is achieved, so as to provide optimized coloring conditions and classification criteria to be used in actual pellet inspection, and wherein, in a process of photographing the plurality of pellets while changing the Red/Green/Blue/White irradiation section, a size of a Red irradiation section, a size of a Green irradiation section, a size of a Blue irradiation section, and a size of a White irradiation section are adaptively changed based on a deviation between a unique color information of the plurality pellets to be inspected and a defect detection result.

11. The method of claim 10, wherein, in the photographing of the plurality of pellets while changing the Red/Green/Blue/White irradiation section, a reference color is reflected so that a size setting and an irradiation intensity of the Red/Green/Blue/White irradiation section are adjusted based on the unique color information of the plurality of pellets to be inspected.

12. The method of claim 10, wherein in the photographing the multi color tone pellet inspection controller accumulates defect values for each of the Red/Green/Blue/White irradiation sections and outputs a final defect value based on the accumulated defect values for each of the Red irradiation section, Green irradiation section, Blue irradiation section, and White irradiation section.

* * * * *